United States Patent Office 3,557,211
Patented Jan. 19, 1971

3,557,211
SUBSTITUTED N,N'-BIS(ACETYL)-
O-PHENYLENE DIAMINES
Edmund J. Rumanowski, Dover, N.J., assignor to Tenneco Chemicals, Inc., a corporation of Delaware
No Drawing. Filed Oct. 25, 1967, Ser. No. 677,853
Int. Cl. C07c *103/30*
U.S. Cl. 260—562     6 Claims

ABSTRACT OF THE DISCLOSURE

Compounds having the structural formula

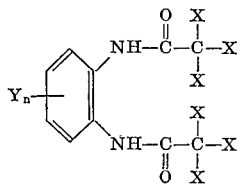

wherein each X represents hydrogen, chlorine, or fluorine and each Y represents, halogen, lower alkyl, lower alkoxy, cyano, trifluoromethyl, or nitro, and $n$ represents an integer in the range of zero to four; are useful in the control of the growth of plants, insects, and fungi. Illustrative of these compounds are N,N'-bis(trichloroacetyl)-4,5-dichloro-o-phenylene diamine, N,N'-bis(chloroacetyl)-4,5-dichloro-o-phenylene diamine, and N,N'-bis(trifluoroacetyl)-3,4,5-tribromo-o-phenylene diamine.

---

This invention relates to pesticidal compositions and to their use in the control of various plant and animal pests. More particularly, it relates to the use in the control of the growth of undesirable plants, insects, and fungi of pesticidal compounds that contain substituted N,N'-bis(acetyl)-o-phenylene diamines as their active ingredient.

In accordance with this invention, it has been discovered that certain substituted N,N'-bis(acetyl)-o-phenylene diamines have unusual and valuable activity as herbicides, as insecticides, and as fungicides. These compounds may be represented by the structure

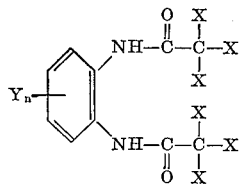

wherein each X represents hydrogen, chlorine, or fluorine and each Y represents, chlorine, bromine, iodine, fluorine, an alkyl group having 1 to 4 carbon atoms, an alkoxy group having 1 to 4 carbon atoms, a cyano group, a trifluoromethyl group, or a nitro group, and $n$ represents an integer in the range of zero to four. The preferred composition for use as pesticides are those in which at least two and preferably four or more of the X substituents represent chlorine or fluorine and the Y substituents represents chlorine or bromine atoms in the 4 and 5 positions of the aromatic ring. Illustrative of these compounds are N,N'-bis(chloroacetyl)-4,5-dichloro-o-phenylene diamine, N,N' - bis(trichloroacetyl)-4,5-dichloro-o-phenylene diamine, N,N' - bis(difluoroacetyl)-4,5-dichloro-o-phenylene diamine, N,N' - bis(difluorochloroacetyl)-3,4,5-trichlor-o-phenylene diamine, and the like.

The substituted N,N'-bis(acetyl)-o-phenylene diamines of this invention may be prepared by a suitable and convenient procedure. For example, they may be prepared by reacting the appropriate o-phenylene diamine with a substantially equivalent amount of acetyl chloride, a haloacetyl chloride, acetyl anhydride, a haloacetic anhydride, or a mixture of these compounds. If desired, an excess of about 5% to 30% of acetyl chloride or the acetic anhydride may be used. The reaction may be carried out in the absence of a solvent or in the presence of a hydrocarbon or ether, such as heptane, toluene, xylene, or isopropyl ether. Particularly satisfactory results have been obtained by mixing an o-phenylene diamine with a slight excess of a haloacetic anhydride, such as trifluoroacetic anhydride, at a temperature below about 40° C. and then heating the mixture at a temperature in the range of about 60° to 100° C. until the reaction has been completed.

The pesticides of this invention may be applied to a wide variety of plants, insects, fungi, and other pests to control or inhibit their growth. While each of the compounds having the aforementioned structure has been found to be useful in the control of certain of the pests, the particular type of organism upon which each exerts its major effect is largely dependent upon the number and the nature of the substitutents on the aromatic ring and/or on the acetyl groups. Thus it has been found that N,N'-bis(chloroacetyl)-4,5-dichloro-o-phenylene diamine is most effective as a selective herbicide, while N,N'-bis(trifluoroacetyl)-o-phenylene diamine is valuable as a herbicide, as a fungicide, and as an insecticide. The locus in which pest control is to be effected may, if desired, be treated with the compounds of this invention. Alternatively, these compounds may be applied directly to the undesirable organisms to control or inhibit their growth.

While the substituted N,N'-bis(acetyl)-o-phenylene diamines may be used as such in the processes of this invention, they are usually and preferably used in combination with an inert carrier that facilitates the dispensing of dosage quantities of the pesticide and assists in its absorption by the organism whose growth is to be controlled. The pesticidal compounds may be mixed with or deposited upon inert particulate solids, such as fuller's earth, talc, diatomaceous earth, hydrated calcium silicate, kaolin, and the like to form dry particulate compositions. Such compositions may, if desired, be dispersed in water with or without the aid of a surface-active agent. The pesticidal compounds are preferably dispensed in the form of solutions or dispersions in inert organic solvents, water, or mixtures of inert organic solvents and water or as oil-in-water emulsions. The concentration of the substituted N,N'-bis(acetyl)-o-phenylene diamines in the pesticidal compositions may vary within wide limits and depends upon a number of factors, the most important of which are the type or types of organisms being treated and the rate at which the composition is to be applied. In most cases the composition contains approximately 0.1% to 85% by weight of one or more of the aforementioned substituted N,N'-bis(acetyl)-o-phenylene diamines. If desired, other pesticidal compounds may be also present in the compositions.

To achieve satisfactory pest control, the compositions are usually used at a rate that will apply approximately 0.5 pound to 30 pounds and preferably 2 pounds to 10 pounds of the pesticidal compound per acre.

The invention is illustrated by the examples that follow. In these examples, all percentages are percentages by weight.

EXAMPLE 1

To a mixture of 8.9 grams (0.05 mole) of 4,5-dichloro-o-phenylene diamine and 100 ml. of toluene at 60°–65° C. was added 18.2 grams (0.1 mole) of trichloroacetyl chloride over a period of 10 minutes. The reaction mixture was heated at its reflux temperature for 6 hours, cooled to room temperature, and filtered. The crude product was washed with 25 ml. of toluene, then with 25 ml. of petroleum ether (20°–40° C.) and dried. There was obtained a 74 percent yield of N,N'-bis(trichloroacetyl)-4,5-dichloro-o-phenylene diamine, which melted at 240°–242° C. and which contained 59.4% Cl, 5.96% N, 25.3% C, and 0.83 H (calculated, 60.7% Cl, 6.0% N, 25.6% C, and 0.85% H). Infrared analysis of the product indicated that it contained the amide function.

EXAMPLE 2

A mixture of 8.9 grams (0.05 mole) of 4,5-dichloro-o-phenylene diamine, 11.1 grams (0.11 mole) of triethylamine, and 100 ml. of ethanol was maintiined at 0° C. to 10° C. while 12.4 grams (0.11 mole) of chloroacetyl chloride was added to it over a period of 10 minutes. The reaction was warmed to room temperature, diluted with three times its volume of water, and filtered. The product obtained was recrystallized from ethanol. The N,N'-bis-(chloroacetyl)-4,5-dichloro-o-phenylene diamine obtained melted at 153°–154° C. and contained 42.9% Cl, 8.49% N, 37.7% C, and 2.44% H (calculated, 43.0% Cl, 8.48% N, 36.4% C, and 2.42% H).

EXAMPLE 3

Twenty-five grams (0.12 mole) of trifluoroacetic anhydride was added to 8.9 grams (0.05 mole) of 4,5-dichloro-o-phenylene diamine over a period of 10 minutes during which the temperature of the mixture was not allowed to exceed 40° C. The reaction mixture was heated for one hour at 75°–80° C., cooled to room temperature, diluted with three times its volume of water, and filtered. The product was recrystallized from chloroform. The N,N'-bis-(trifluoroacetyl)-4,5-dichloro-o-phenylene diamine obtained melted at 155°–157° C. and contained 21.6% Cl, 7.4% N, 33.2% C, and 1.00% H (calculated, 19.2% Cl, 7.6% N, 32.5% C, and 1.08% H).

EXAMPLES 4–18

Using the procedures described in Examples 1–3, a series of substituted N,N'-bis(acetyl)-o-phenylene diamines was prepared. The compounds prepared, the method used, and the properties of the products are set forth in Table I.

TABLE I

| Example No. | Compound | Method of preparation, Example No. | Yield, percent | Melting point, °C. | Cl Found | Cl Calc. | N Found | N Calc. | C Found | C Calc |
|---|---|---|---|---|---|---|---|---|---|---|
| 4 | N,N'-bis(acetyl)-4,5-dichloro-o-phenylene diamine. | 3 | 89 | 254–255(d.) | 27.1 | 27.2 | 10.8 | 10.7 | 45.7 | 46.0 |
| 5 | N,N'-bis(dichloroacetyl)-4,5-dichloro-o-phenylene diamine. | 1 | 85 | 210–211 | 53.2 | 53.4 | 7.14 | 7.0 | 31.1 | 30.1 |
| 6 | N,N'-bis(difluorochloro)-4,5-dichloro-o-phenylene diamine. | 3 | 84 | 144–146 | 34.4 | 35.3 | 7.45 | 6.97 | 31.5 | 29.9 |
| 7 | N,N'-bis(trichloroacetyl)-4,5-dimethyl-o-phenylene diamine. | 1 | 81 | 253–255(d.) | 48.3 | 49.9 | 6.68 | 6.56 | 34.9 | 33.7 |
| 8 | N,N'-bis(trifluoroacetyl)-4,5-dimethyl-o-phenylene diamine. | 3 | 82 | 168–170 | | | 8.48 | 8.54 | 43.8 | 43.6 |
| 9 | N,N'-bis(trichloroacetyl)-4-chloro-o-phenylene diamine. | 1 | 72 | 220–221 | 56.7 | 57.4 | 6.48 | 6.47 | 27.4 | 27.7 |
| 10 | N,N'-bis(trifluoroacetyl)-4-chloro-o-phenylene diamine. | 3 | 88 | 129–130 | | | 8.33 | 8.36 | 35.5 | 35.8 |
| 11 | N,N'-bis(trifluoroacetyl)-4-nitro-o-phenylene diamine. | 3 | 60 | 102–112 | | | 12.4 | 12.2 | 35.0 | 34.8 |
| 12 | N,N'-bis(trifluoroacetyl)-4-methoxy-o-phenylene diamine. | 3 | 78 | 133–134(d.) | | | 8.19 | 8.50 | 39.8 | 40.0 |
| 13 | N,N'-bis(trifluoroacetyl)-4-methyl-o-phenylene diamine. | 3 | 93 | 134–136 | | | 8.94 | 8.9 | 42.2 | 42.0 |
| 14 | N,N'-bis(trifluoroacetyl)-4-carboxy-o-phenylene diamine. | 3 | 60 | | | | 7.95 | 8.14 | 38.1 | 38.3 |
| 15 | N,N'-bis(trichloroacetyl)-o-phenylene diamine. | 1 | 90 | 233–234 | 53.3 | 53.4 | | | | |
| 16 | N,N'-bis(trifluoroacetyl)-o-phenylene diamine. | 3 | 83 | 157–159 | | | 9.09 | 9.33 | | |
| 17 | N,N'-bis(trifluoroacetyl)-3-nitro-o-phenylene diamine. | 3 | 66 | 251–253 | | | 12.0 | 12.2 | 34.4 | 34.8 |
| 18 | N,N'-bis(trifluoroacetyl)-3-nitro-5-chloro-o-phenylene diamine. | 3 | 70 | 166–169 | 11.4 | 9.3 | 13.6 | 11.1 | 33.5 | 31.6 |

EXAMPLE 19

Acetone solutions were prepared by dissolving 100 mg. portions of the products of Examples 1–18 in 10 ml. portions of acetone that contained 2000 p.p.m. of sorbitan trioleate and 5000 p.p.m. of a polyoxyetheylene ether of sorbitan monooleate. The acetone solutions were dispersed in 90 ml. portions of distilled water to form aqueous solutions that contained 0.1 percent of the substituted N,N'-bis(acetyl)-o-phenylene diamines.

EXAMPLE 20

Series of tests were carried out in which compounds of this invention were evaluated as preemergence and postemergence selective herbicides. In the preemergence tests, solutions prepared by the procedure described in Example 19 were applied to groups of flats containing soil in which seeds of various plant species had been planted. The results of the tests were observed 10 days after the treatment. The postemergence tests were carried out by spraying seedlings of various plant species with solutions of the novel compounds and observing the results 43 days after treatment. In both series of tests the solutions were used in amounts that supplied 0.63 pound to 20 pounds of test compound per acre.

In Table II a numerical scale is used to show the herbicidal activity of the test compounds. On this scale, 1 indicates no injury to the plants; 2 indicates slight injury; 3 indicates moderate injury; 4 indicates severe injury; and 5 indicates that all of the plants were killed.

TABLE II.—HERBICIDAL ACTIVITY OF SUBSTITUTED N,N'-BIS(ACETYL)-O-PHENYLENE DIAMINES

| | Plant species | | | | | | | | | | | |
|---|---|---|---|---|---|---|---|---|---|---|---|---|
| | Clover | Soybean | Sugar beet | Cotton | Corn | Oats | Mustard | Morning glory | Buckwheat | Rye grass | Crab grass | Yellow foxtail |
| Product of Ex. 1: | | | | | | | | | | | | |
| Preemergence, 20 lb./acre | 3 | 1 | 2 | 2 | 2 | 1 | 3 | 2 | 1 | 1 | 3 | 1 |
| Postemergence: | | | | | | | | | | | | |
| 20 lb./acre | 5 | 3 | 4 | 4 | 3 | 2 | 5 | 4 | 5 | 3 | 3 | 3 |
| 10 lb./acre | 4 | 3 | 4 | 3 | 2 | 2 | 3 | 2 | 5 | 1 | 2 | 1 |
| 5 lb./acre | 2 | 2 | 1 | 2 | 1 | 1 | 3 | 1 | 2 | 1 | 1 | 1 |
| Product of Ex. 3: | | | | | | | | | | | | |
| Postemergence: | | | | | | | | | | | | |
| 20 lb./acre | 5 | 5 | 5 | 5 | 5 | 5 | 5 | 5 | 5 | 5 | 5 | 5 |
| 10 lb./acre | 5 | 5 | 5 | 4 | 4 | 4 | 5 | 5 | 5 | 5 | 5 | 5 |
| 5 lb./acre | 5 | 5 | 5 | 5 | 4 | 5 | 5 | 5 | 5 | 5 | 5 | 5 |
| 2.5 lb./acre | 4 | 3 | 5 | 5 | 2 | 3 | 5 | 4 | 5 | 4 | 2 | 4 |
| 1.25 lb. acre | 3 | 3 | 5 | 4 | 2 | 2 | 4 | 4 | 5 | 3 | 4 | 3 |
| 0.63 lb./acre | 3 | 2 | 5 | 1 | 2 | 2 | 4 | 2 | 5 | 3 | 2 | 2 |
| Preemergence: | | | | | | | | | | | | |
| 20 lb./acre | 4 | 1 | 5 | 4 | 1 | 1 | 4 | 1 | 1 | 4 | 5 | 4 |
| 10 lb./acre | 3 | 1 | 5 | 3 | 1 | 1 | 3 | 1 | 1 | 4 | 5 | 4 |
| 5 lb./acre | 3 | 1 | 5 | 1 | 1 | 1 | 3 | 1 | 1 | 2 | 3 | 2 |
| 2.5 lb./acre | 3 | 1 | 2 | 1 | 1 | 1 | 2 | 1 | 1 | 1 | 4 | 3 |
| 1.25 lb./acre | 1 | 1 | 2 | 1 | 1 | 1 | 2 | 1 | 1 | 1 | 1 | 1 |
| Product of Ex. 4: | | | | | | | | | | | | |
| Postemergence, 20 lb./acre | 3 | 3 | 4 | 2 | 2 | 2 | 5 | 2 | 3 | 2 | 2 | 1 |
| Preemergence, 20 lb./acre | 1 | 1 | 1 | 1 | 1 | 1 | 1 | 1 | 1 | 1 | 1 | 1 |
| Product of Ex. 6: | | | | | | | | | | | | |
| Postemergence, 20 lb./acre | 5 | 4 | 5 | 5 | 4 | 5 | 5 | 5 | 5 | 5 | 5 | 5 |
| Preemergence, 20 lb./acre | 4 | 1 | 5 | 1 | 1 | 2 | 5 | 1 | 3 | 3 | 4 | 4 |
| Product of Ex. 8: | | | | | | | | | | | | |
| Postemergence, 20 lb./acre | 4 | 3 | 5 | 2 | 3 | 4 | 5 | 2 | 5 | 4 | 4 | 2 |
| Preemergence, 20 lb./acre | 3 | 1 | 4 | 2 | 1 | 1 | 5 | 1 | 1 | 1 | 2 | 1 |
| Product of Ex. 10: | | | | | | | | | | | | |
| Postemergence, 20 lb./acre | 5 | 5 | 5 | 5 | 4 | 5 | 5 | 5 | 5 | 5 | 5 | 5 |
| Preemergence, 20 lb./acre | 4 | 1 | 5 | 1 | 1 | 1 | 2 | 1 | 1 | 1 | 4 | 3 |
| Product of Ex. 12: | | | | | | | | | | | | |
| Postemergence, 20 lb./acre | 4 | 3 | 5 | 2 | 3 | 2 | 5 | 2 | 5 | 2 | 3 | 2 |
| Preemergence, 20 lb./acre | 1 | 1 | 4 | 1 | 1 | 1 | 4 | 1 | 1 | 1 | 1 | 1 |
| Product of Ex. 13: | | | | | | | | | | | | |
| Postemergence, 20 lb./acre | 5 | 2 | 5 | 3 | 3 | 3 | 5 | 3 | 5 | 5 | 5 | 3 |
| Preemergence, 20 lb./acre | 5 | 1 | 5 | 2 | 2 | 1 | 5 | 1 | 1 | 1 | 5 | 3 |
| Product of Ex. 16: | | | | | | | | | | | | |
| Postemergence, 20 lb./acre | 5 | 3 | 5 | 2 | 2 | 2 | 5 | 2 | 5 | 3 | 4 | 2 |
| Preemergence, 20 lb./acre | 2 | 1 | 4 | 2 | 1 | 1 | 1 | 1 | 1 | 1 | 1 | 1 |
| Product of Ex. 18: | | | | | | | | | | | | |
| Postemergence, 20 lb./acre | 5 | 5 | 5 | 5 | 5 | 5 | 5 | 5 | 5 | 5 | 5 | 4 |
| Preemergence, 20 lb./acre | 5 | 1 | 5 | 2 | 1 | 4 | 5 | 3 | 1 | 3 | 4 | 4 |

EXAMPLE 21

Separate lots of sterilized soil were inoculated with plant pathogens. The inoculated soil was placed in 4-ounce containers, and the soil in each container was drenched with 30 ml. of an aqueous suspension containing an amount of the test compound sufficient to provide the desired dosage rate. After incubation for two days at 70° F., the amount of mycelial growth on the surface of the soil was noted. The results of the tests are given in Table III. In this table, a rating of 1 indicates growth equal to that in inoculated soil that had not been treated with a fungicide; 2 indicates that about 75% of the surface was covered with colonies of the organism; 3 indicates that about 50% of the surface was covered with colonies of the organism; 4 indicates that a few scattered colonies were present; and 5 indicates no growth on the surface of the soil.

TABLE III.—ACTIVITY OF SUBSTITUTED N,N'-BIS(ACETYL)-O-PHENYLENE DIAMINES AS SOIL FUNGICIDES

| Pesticide | Rate of application (lb. acre) | Sclerotium rolfsii | Pythium sp. | Rhizoctonia solani | Fusarium oxysporum |
|---|---|---|---|---|---|
| Product of Ex. 2 | 300 | 4 | 1 | 1 | 3 |
| | 150 | 3 | | | |
| | 75 | 3 | | | |
| | 37 | 2 | | | |
| Product of Ex. 3 | 300 | 5 | 5 | 5 | 3 |
| | 150 | 4 | 4 | 4 | |
| | 75 | 4 | 3 | 4 | |
| | 37 | 3 | 3 | 2 | |
| Product of Ex. 4 | 300 | 5 | 5 | 5 | 3 |
| | 150 | 2 | 1 | 1 | 1 |
| Product of Ex. 5 | 300 | 1 | 5 | 3 | 3 |
| Product of Ex. 6 | 300 | 5 | 3 | 4 | 2 |
| | 150 | 3 | | 1 | |
| Product of Ex. 7 | 300 | 1 | 5 | 3 | 1 |
| Product of Ex. 10 | 300 | 5 | 5 | 5 | 4 |
| | 150 | 5 | 5 | 5 | 4 |
| | 75 | 5 | 4 | 4 | 1 |
| | 37 | 4 | 3 | 3 | 1 |
| Product of Ex. 12 | 300 | 5 | 4 | 1 | 1 |
| Product of Ex. 13 | 300 | 5 | 5 | 5 | 1 |
| | 150 | 5 | 4 | 1 | |
| | 75 | 3 | 3 | 1 | |
| Product of Ex. 15 | 300 | 1 | 5 | 3 | 3 |
| Product of Ex. 16 | 300 | 5 | 5 | 1 | 1 |
| | 150 | 4 | 1 | | |
| | 75 | 2 | 1 | | |
| Product of Ex. 18 | 300 | 5 | 5 | 5 | 5 |
| | 150 | 5 | 5 | 5 | 5 |
| | 75 | 5 | 4 | 5 | 4 |
| | 37 | 4 | 1 | 4 | 2 |

EXAMPLE 22

In a series of experiments in which the substituted N,N'-(bis(acetyl)-o-phenylene diamines were applied to plants infested with Mexican bean beetles, Southern armyworms, aphids, houseflies, and 2-spotted spider mites, the results summarized in Table IV were obtained. In no case was there appreciable damage to the plants.

TABLE IV.—ACTIVITY OF SUBSTITUTED N,N'-BIS(ACETYL)-O-PHENYLENE DIAMINES AS INSECTICIDES

| Pesticide | Rate of application (p.p.m.) | Mexican bean beetle | Southern armyworm | Aphid | Housefly | 2-spotted spider mite |
|---|---|---|---|---|---|---|
| Product of Ex. 1 | 1,000 | 0 | 0 | 80 | 100 | 0 |
|  | 250 |  |  | 50 | 100 |  |
|  | 100 |  |  | 0 | 100 |  |
|  | 50 |  |  |  | 100 |  |
|  | 12.5 |  |  |  | 100 |  |
| Product of Ex. 2 | 1,000 | 100 | 0 | 0 | 80 | 0 |
| Product of Ex. 3 | 1,000 | 0 | 100 | 100 | 100 | 100 |
|  | 250 |  |  | 100 | 100 | 100 |
|  | 50 |  |  | 65 | 15 | 80 |
| Product of Ex. 4 | 1,000 | 80 | 0 | 50 | 100 | 0 |
|  | 250 |  |  |  | 100 | 0 |
|  | 50 |  |  |  | 80 |  |
| Product of Ex. 5 | 1,000 | 0 | 0 | 0 | 100 | 0 |
|  | 250 |  |  |  | 100 |  |
|  | 50 |  |  |  | 5 |  |
| Product of Ex. 6 | 1,000 | 0 | 0 | 100 | 100 | 30 |
|  | 500 |  |  | 90 | 70 |  |
|  | 250 |  |  | 90 | 50 |  |
|  | 50 |  |  | 50 | 5 |  |
| Product of Ex. 7 | 250 |  |  |  | 100 |  |
|  | 50 |  |  |  | 35 |  |
| Product of Ex. 8 | 1,000 | 80 | 0 | 100 | 100 | 100 |
| Product of Ex. 10 | 1,000 | 0 | 0 | 25 | 100 | 80 |
|  | 250 |  |  |  | 85 |  |
| Product of Ex. 12 | 1,000 | 0 | 0 | 0 | 100 | 0 |
| Product of Ex. 13 | 1,000 | 0 | 0 | 0 | 100 | 0 |
| Product of Ex. 16 | 1,000 | 0 | 0 | 25 | 100 | 0 |
| Product of Ex. 18 | 1,000 | 80 | 0 | 100 | 100 | 100 |
|  | 250 | 90 |  |  |  | 100 |
|  | 50 | 20 |  |  |  | 65 |

The terms and expressions which have been employed are used as terms of description and not of limitation. There is no intention in the use of such terms and expressions of excluding any equivalents of the features shown and described or portions thereof; it is recognized, however, that various modifications are possible within the scope of the invention claimed.

What is claimed is:
1. A compound that has the structural formula

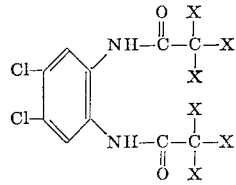

wherein each X represents hydrogen, chlorine, or flourine.

2. A compound according to claim 1 wherein each of the X substituents represents fluorine.
3. A compound according to claim 1 wherein each of the X substituents represents chlorine.
4. A compound according to claim 1 wherein at least 2 of the X substituents represents chlorine or fluorine.
5. A compound according to claim 1 wherein at least 4 of the X substituents represent fluorine.
6. A compound according to claim 1 wherein at least 4 of the X substituents represents chlorine.

References Cited

Chemical Abstracts, vol. 6, p. 1903 (Bogert et al.); vol. 22, col. 1356–57 (Phillips); vol. 25, col. 4556 (I. G. Farbenind, British Pat. 343,744); vol. 25, col. 4265 (Phillips) vol. 38, col. 730 (Frisch et al.); vol. 44, col. 1431–33 (Everett et al.); vol. 46, col. 90–91 (Arora et al.); vol. 47, col. 6894 (Adams et al.); vol. 50, col. 13017 (Boyer et al.); vol. 51, col. 12917–18 (Gillespie et al.); vol. 52, col. 12211 (Tricerri et al.); vol. 52, col. 7179 (Cho-Tung Tu et al.).

HENRY R. JILES, Primary Examiner

H. I. MOATZ, Assistant Examiner

U.S. Cl. X.R.

71—118, 105, 114; 260—471, 465; 424—324, 317, 304